P. BEDEAU.
Process for Manufacturing Ornamented Moldings of Carton-Pierre or other Similar Plastic Substances.

No. 219,843. Patented Sept. 23, 1879.

Witnesses:
J. G. Goetz
Eugene Pasquier

Inventor:
Paul Bedeau

UNITED STATES PATENT OFFICE.

PAUL BEDEAU, OF ST. LOUIS, MISSOURI.

IMPROVEMENT IN PROCESSES FOR MANUFACTURING ORNAMENTED MOLDINGS OF CARTON-PIERRE OR OTHER SIMILAR PLASTIC SUBSTANCE.

Specification forming part of Letters Patent No. 219,843, dated September 23, 1879; application filed July 31, 1879.

*To all whom it may concern:*

Be it known that I, PAUL BEDEAU, of the city of St. Louis, State of Missouri, have invented a new and useful Process for Manufacturing Ornamented Moldings of Carton-Pierre or other Similar Plastic Substance, of which the following is a specification.

My invention relates to processes whereby ornamented moldings in carton-pierre or other similar materials are formed through a machine by circular, or nearly circular, molding-dies; and consists in the employment, in conjunction with the machine, of, first, dies in the shape of rings or segments made of an electro-deposited metal film strengthened by a backing of some suitable material as active or working medium; and, second, carton-pierre or other plastic material, with or without a backing of cotton, linen, hemp, or any other suitable kind of cloth, as the material to be wrought into an ornamented molding.

Figure 1:
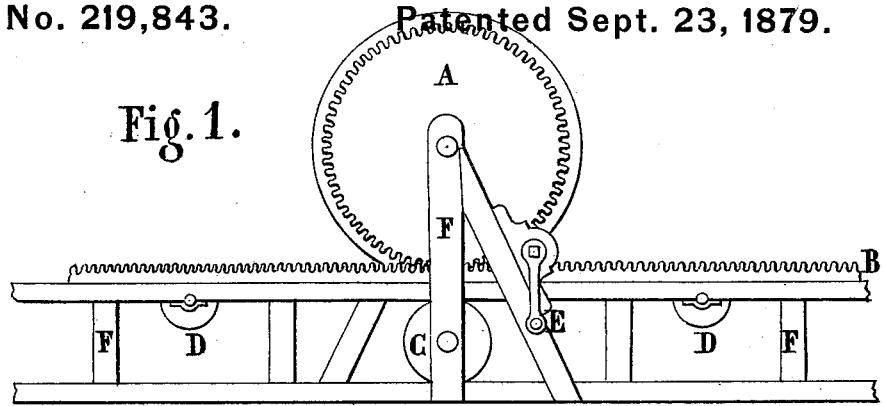
Figure 2:
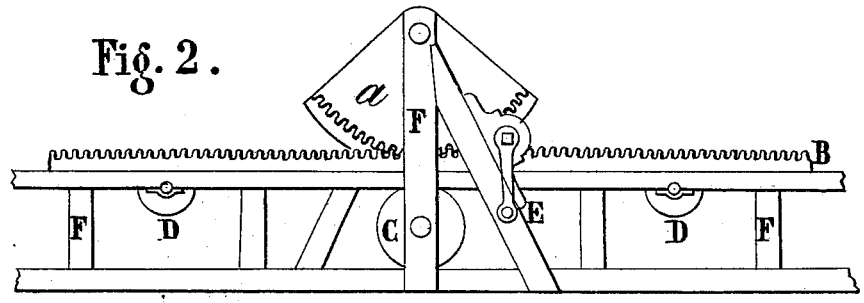
Figures 3, 4:
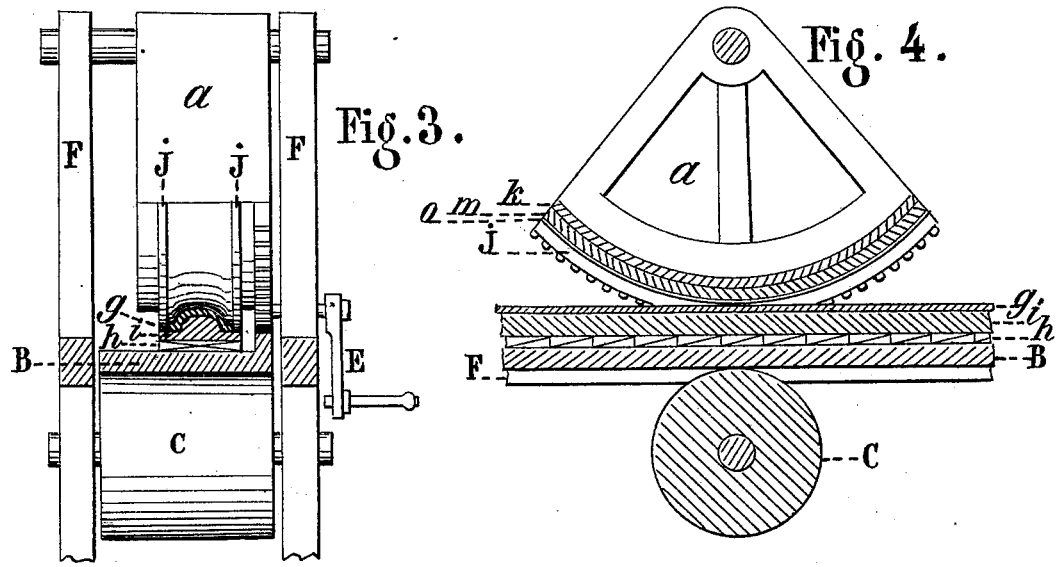

The machine is represented in the accompanying drawings, in which Figures 1 and 2 are longitudinal elevations, Fig. 1 representing a machine with circular molding-die, and Fig. 2 one with segmental molding-die. Fig. 3 is an end view of Fig. 2 enlarged, and Fig. 4 is a central transverse section of Fig. 3.

The circular drum A, Fig. 1, or the sector a, Figs. 2, 3, and 4, carrying the molding-die composed of the galvano-plastic metal film o, Fig. 4, backing of plaster or soft metal, m, and wood backing k, rotates, together with a cog-wheel and its shaft, in bearings in the uprights of frame F.

The teeth of the wheel gear in those of a rack fastened to the carriage B, and motion is communicated to these parts by a small pinion fastened to the shaft of crank E.

Carriage B moves on rollers D and drum C, and carries on its upper surface the counter-mold i, with the plastic substance g, and a device, h, for regulating the height of the counter-mold by two superposed series of inclined planes.

The projecting part of the counter-mold on each side must bear tight against the cheeks j j, Fig. 3, of the molding-die, so that none of the plastic substance can escape laterally.

In carrying out my invention I produce by electro-deposition, preferably of copper, an intaglio molding, which, if not directly obtained in circular shape, I bend to the proper radius, and which I provide with a backing of plaster or soft metal, and, if necessary, an additional backing of hard wood, in such a manner that the molding thus strengthened shall be of uniform and even thickness. This part I designate in this specification with the name of "molding-die," and if in the shape of a ring fit it to circular drum A, Fig. 1, or, if in the shape of a segment, to a sector, a, Fig. 2.

The carton-pierre or other plastic material, g, Fig. 3, I place in the shape of a band of the proper width on a properly-shaped counter-mold, which is a molding somewhat roughly shaped, so as to leave the manufactured molding of a perceptibly even thickness throughout its length. This counter-mold has been previously fastened to the upper surface of carriage B, and regulated to the proper height by inclined planes h.

All parts of the plastic material, dusted over with a powder to prevent adherence, are then brought by the simultaneous motion of carriage B and drum A, or sector a, successively under the developing circumference of the molding-die, which thus transfers its intaglio imprint to the plastic material, and produces the exact cameo counterpart in the shape of an ornamented molding.

I am well aware that this my process of manufacturing ornamented moldings may be worked by machines of various forms and designs. I therefore do not confine myself to this particular machine.

What I claim as my invention is—

The process of manufacturing ornamented moldings of carton-pierre or other plastic materials, with or without a backing of cloth, by means of circular, or nearly circular, shaped molding-dies of electro-deposited metal strengthened by a backing, when the same is used in a machine, the whole substantially as described, and for the purpose set forth.

PAUL BEDEAU.

Witnesses:
JOS. JERKO,
J. G. GOESELY.